Dec. 31, 1963   E. WATTS   3,115,707
CARPENTER'S FRAMING SCALE
Filed Jan. 31, 1958   2 Sheets-Sheet 1
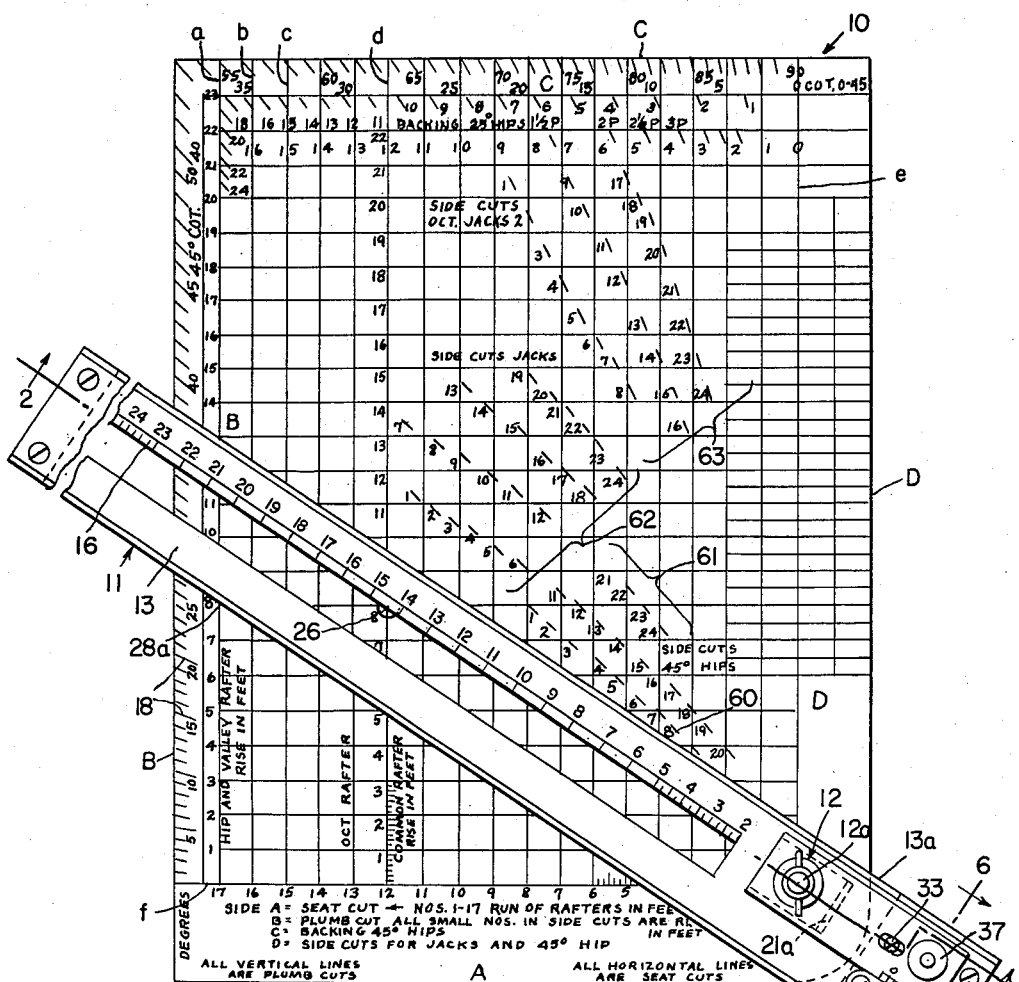
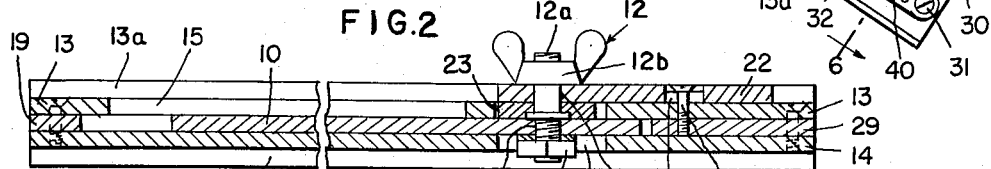
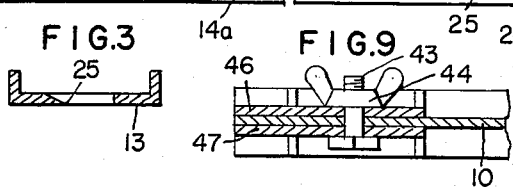
INVENTOR.
Edgar Watts
BY Shoemaker & Mattare
Attys.

Dec. 31, 1963  E. WATTS  3,115,707
CARPENTER'S FRAMING SCALE
Filed Jan. 31, 1958  2 Sheets-Sheet 2
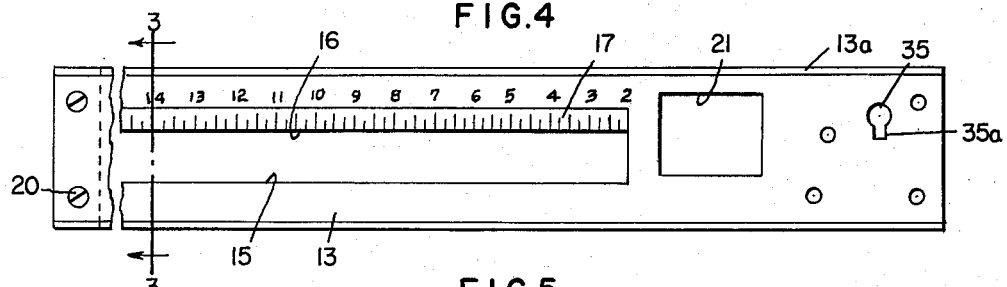
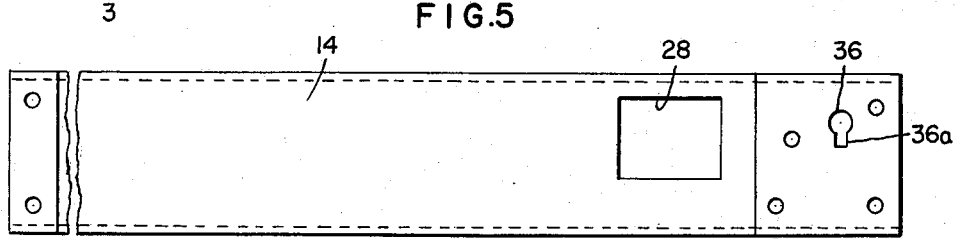
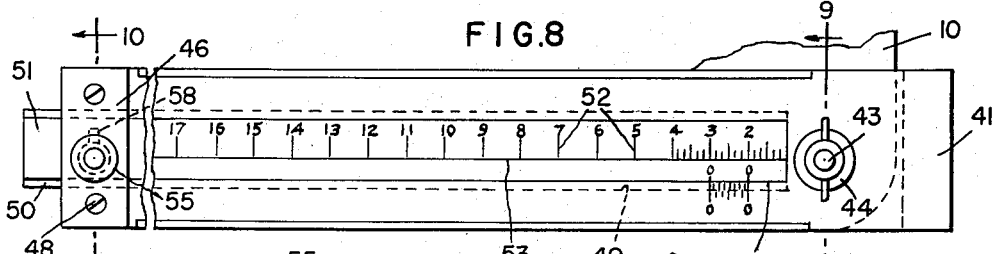
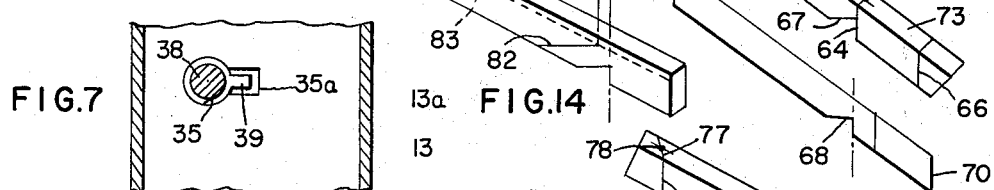
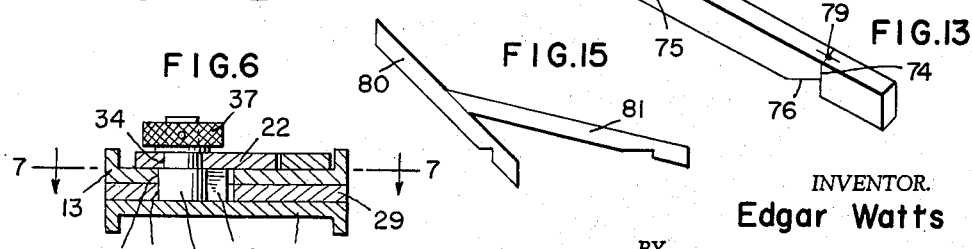
INVENTOR.
Edgar Watts
BY Shoemaker + Mattare
ATTYS United States Patent Office 3,115,707
Patented Dec. 31, 1963

3,115,707
CARPENTER'S FRAMING SCALE
Edgar Watts, Armstrong, British Columbia, Canada, assignor to Dan D. Basaraba, Williams Lake, British Columbia, Canada
Filed Jan. 31, 1958, Ser. No. 712,505
8 Claims. (Cl. 33—93)

This invention relates in general to geometrical instruments and pertains more particularly to a scale device particularly adapted for determining angles of cut for rafters and the like for use by carpenters and also for determining distance between centers in, for example, hip and valley rafters.

In cutting rafters or the like to proper lengths and to proper angles for the formation of roofs, the amount of mathematical computation necessary to accurately determine the angle of cut and the distance between centers and lengths of the various structural elements is quite considerable. The use of scales and geometrical devices for determining this type of information is well known but in many instances, such devices either do not give complete information or they are considerably difficult to read and determine and, therefore, cumbersome in use and often more time consuming than computations carried out on paper.

Consequently, it is of primary concern in connection with this invention to provide an improved carpenter's roof framing scale of the character above set forth which is of simple construction, easy to understand, rapid in operation and at the same time accurate, obviating waste of material and mistakes.

Another object of this invention is to provide an improved framing scale of the character described incorporating a rectangular base plate element to which is pivotally attached an indicator element, the base plate having prearranged indicia and reference points thereon alignable with the indicator, with the indicator being used as a straight edge to engage a piece of lumber to properly locate certain of the sides of the rectangular main plate which describe the desired angle to which the lumber is to be cut for the purpose intended.

Another object of this invention is to provide an improved carpenter's roof framing scale incorporating a vernier adjustment thereon for accurately determining the length to which a piece of lumber is to be cut so that the several pieces forming, for example, a hip roof frame, can be accurately cut for a given roof span.

Still another object of this invention is to provide an improved form of carpenter's roof framing scale which greatly simplifies and expedites the operation of laying out roof work and which permits the same to be done accurately with little chance of error.

Another object of the invention is to provide an instrument for figuring measurements required in laying out roof framing, wherein there is employed in association with a scale carrying plate, an indicator connected to the plate for pivotal movement over and in cooperation with a scale thereon and having incorporated in its structure mechanism whereby a linear adjustment may be made for obtaining a vernier reading for accuracy.

With the above and other objects in view, the invention consists in the construction and novel combination and ararngement of parts hereinafter fully described, illustrated in the accompanying drawings and pointed out in the claims hereto appended, it being understood that various changes in the form, proportions, and minor details of construction, within the scope of the claims, may be resorted to without departing from the spirit or sacrificing any of the advantages of the invention.

In the drawings:
FIG. 1 is a plan view of the roof framing scale constructed in accordance with this invention and illustrating the structural features thereof as well as the manner in which the reference indicia are laid out upon the base plate and also illustrating the construction of the indicator element and a vernier therefor thereon;

FIG. 2 is an enlarged section taken longitudinally of the indicator substantially on the plane of section line 2—2 in FIG. 1 and illustrating the vernier scales employed in connection with the indicator;

FIG. 3 is a sectional view taken substantially on the line 3—3 of FIG. 4 illustrating the feathered edge of one side of the slot in the top plate of the indicator;

FIG. 4 is a view in plan of the top plate only of the indicator;

FIG. 5 is a plan view of the inner face of the bottom plate of the indicator;

FIG. 6 is a sectional view taken substantially on the line 6—6 of FIG. 1;

FIG. 7 is a horizontal section taken substantially on the line 7—7 of FIG. 6;

FIG. 8 is a view in top plan of a second embodiment of the indicator used in association with the scale plate;

FIG. 9 is a sectional view on an enlarged scale taken substantially on the line 9—9 of FIG. 8;

FIG. 10 is a sectional view on an enlarged scale taken substantially on the line 10—10 of FIG. 8;

FIGS. 11 to 15 illustrate diagrammatically certain of the many timber cuts which may be laid out by the use of the framing scale in the shaping of rafters or the like in roof construction.

Referring now more particularly to the drawings, and more especially to FIG. 1, the reference character 10 generally designates the base plate of the roof framing scale. This plate, as shown, is of rectangular configuration, having the lower edge A, the vertical left side edge B, the top or upper edge C and the vertical right side edge D, all of which edges are made use of in connection with the laying out of lines along which timber pieces are to be cut for the construction of a roof or roofs as determined by the indicator assembly carried by the plate and which is generally indicated by the reference character 11. This indicator assembly is pivotally attached to the lower right hand corner of the main plate 10 by the stud bolt and thumb screw assembly which is generally designated 12 and which embodies the bolt 12a and the thumb nut 12b, as illustrated in detail in FIG. 2.

The indicator assembly comprises the elongate top and bottom plates 13 and 14 respectively, shown separately in FIGS. 4 and 5, and which lie on opposite sides of and sandwich between them the main or base plate 10.

Each of the top and bottom plates 13 and 14 has formed along the longitudinal edges thereof the right angularly projecting flanges 13a and 14a which are employed for engaging the indicator against the side edge of a piece of lumber so that the indicator may be aligned longitudinally of the piece with one or more of the edges A, B, C or D of the base plate angled transversely of the lumber piece for employment in scribing or marking a line therealong to indicate the proper cut to be made for the particular type of rafter or structural element being laid out.

The base plate 10 is provided with a series of vertical or longitudinally extending lines of reference which are designated a, b, c, d, etc., which lines are evenly spaced transversely of the base plate from the side edge B to the side edge D thereof and certain of these lines of reference, as will be hereinafter apparent, are employed for the purpose of laying out a particular type of rafter, jack or the like.

The indicator 11 is of sufficient length to completely clear the upper left corner of the base plate when it is swung around the pivot bolt 12a and thus permit the indicator to turn or be rotated through an angle of 90°.

The top plate 13, at least, of the indicator assembly is provided with a longitudinally extending slot 15 through which may be observed the marked face of the base plate as the indicator is moved thereover.

The uppermost edge of the slot 15 is feathered or the material of the plate is beveled so that such edge will be relatively sharp, as indicated at 16, and this beveled portion is provided with a graduation scale which is designated 17. The purpose of this scale is to determine the length in feet and inches in conjunction with a vernier, of the various structural elements to be cut, as hereinafter described.

In addition to the vertical lines of reference hereinbefore referred to, the base plate is marked transversely to form a number of horizontal reference lines f. One of the vertical lines, designated e, is marked on the plate as the zero vertical reference line, the lines being numbered on the plate from the zero line toward the left side of the plate and the pivot bolt 12a is fixed to and extends through the base plate at the intersection of the lower end of the zero line e and the bottom horizontal line f. The vertical divisions a, b etc. and the horizontal divisions are equally spaced so as to form a gridwork system on the face of the base plate, as shown, and the horizontal divisions represent the rise in feet whereas the vertical divisions are utilized to locate the type of rafter cut which is to be made, for example, hip and valley rafter cuts and common rafter cuts, so that, in effect, the system utilized is one of triangulation with the indicator 11 lying along the hypotenuse.

The vertical side B of the base plate and the top edge C thereof are provided with angular division marks or angle designating scale, the divisions of such scale being indicated by the reference character 18, so that the base line 16 of the indicator may be moved to any desired angle whereby any of the longitudinal edges of the indicator and the bottom edge A of the base plate include the opposite angle therebetween.

As previously stated, the top and bottom plates 13 and 14 of the indicator have the base plate disposed therebetween and the outer end of the indicator includes a transversely disposed spacer 19 which is secured to the two plates by screws 20 or in any suitable manner.

The top plate 13 of the indicator has formed therethrough adjacent to the inner end of the slot 15 the rectangular opening 21 and positioned on the top of the indicator top plate 13 over this opening is a cover plate 22 which lies between the flanges 13a and which carries on its under face a guide block 23 which fits in the opening 21. The guide block 23 is approximately the same width as the opening 21 so as to fit snugly therein, but it is of a length slightly less than the opening 21 for the purpose hereinafter set forth.

The cover plate 22 has formed therethrough and through the guide block 23 the bolt opening 24 to reecive the upper end of the bolt 12a which is fixed in a suitable opening 25 formed through the base plate 10, being held in position on the base plate by the nut 26 which bears against the underside of the base plate, as shown in FIG. 2.

In addition to the opening 24 through the cover plate and the guide block carried thereby, the cover plate is provided with the elliptical opening 27 the long axis of which is directed longitudinally of the cover plate in line with the center of the bolt.

The bottom plate 14 of the indicator is also provided with an opening 28 which is in line with the opening 21 of the top plate and in this opening 28 the nut 26 lies. This latter opening is of the proper dimensions to permit longitudinal shifting of the indicator in the operation of performing desired calculations.

It will be seen upon reference to FIG. 2 that the top and bottom plates of the indicator project at the pivoted end a substantial distance beyond the rounded bottom right corner of the base plate and the bottom plate 14 of the indicator carries on its upper face the spacer block 29 against which the under face of the top plate 13 engages and securing screws 30 and 31 and 32 couple the top and bottom plates of the indicator together through the spacer block 29.

Some clearance is allowed between the edge of the base plate 10 and the adjacent edge of the spacer block 29 to permit the hereinbefore referred-to longitudinal adjustment of the indicator.

The numeral 33 designates a guide screw which extends through the elongate or elliptical slot 27 into and through the top plate 13 and into the spacer block 29 as shown in FIG. 2. In the use of the indicator this guide screw is not tightened down but permits the desired movement of the indicator.

The cover plate 22 has formed therethrough outwardly from or beyond the screw 33, with respect to the bolt 12a, an aperture 34 which aligns with two openings 35 and 36 formed respectively through the top indicator plate 13 and the spacer block 29, as shown in FIG. 6. Each of these openings 35 and 36 has an offset or eccentric slot 35a and 36a, which slots are also in alignment.

The numeral 37 designates a vernier knob which is mounted on the upper end of a stud 38, the lower portion of which stud is located in the aligned openings 35 and 36 and the upper end of which extends through the cover plate opening 34 to receive the knob 37 upon its upper end.

The stud 38 carries the short radial finger 39 which extends into the eccentric slots 35a and 36a and is adapted upon the rotation of the stud through the medium of the knob 37, to longitudinally shift or slide the indicator in respect to the base plate 10 and the cover plate 22.

The cover plate 22 has laid out along its lower edge and adjacent to the outer end thereof a vernier scale which cooperates with a corresponding scale laid out along the edge of a fixed strip 40 which is secured by the screws 31 and 32 to the top of the top indicator plate 13 as shown in FIG. 1.

The vernier graduations on the relatively movable cover plate 22 and strip 40 are of the magnitude of $\frac{1}{32}$ of an inch and it will be apparent upon reference to FIG. 1 and from the preceding description that when the vernier knob 37 is turned, the indicator can be moved within the limits of the space 21a between the end of the cover plate carried block 23 and the adjacent end of the opening 21 in which the block is located and the vernier scales upon the fixed and movable members will be relatively shifted in an obvious manner to indicate fractions of an inch.

In FIG. 8 there is illustrated in top plan a modified form of the pivoted indicator wherein the top plate of the two plates corresponding to the plates 13 and 14, carries a longitudinally adjustable slide. It will be understood that in this modified construction there are the two spaced elongate plates like the plates 13 and 14, as stated, and the upper one of these two plates only is illustrated in the plan view forming FIG. 8 and is designated 41.

In the cross sectional views forming FIGS. 9 and 10, the lower plate for this modified indicator is designated 42.

The plates 41 and 42 are pivotally attached to the base plate 10 by the bolt 43 and wing nut 44 and by this assembly, after the indicator has been moved to a desired position with respect to the base plate 10, it can be securely clamped in position by tightening the wing nut 44.

At the outer ends of the plates 41 and 42 there is inserted therebetween a spacer member 45 and upon the outer faces of the top and bottom plates are positioned the blocks 46 and 47 and these blocks and the spacer 45 are all secured together by the screws 48 shown in FIG. 8.

In this modified construction of the indicator the flanges along the longitudinal edges of the top and bottom plates of the indicator do not run the full length of the plates but terminate at their outer ends short of the blocks 46 and 47 and at the pivoted end of the indicator they preferably terminate adjacent to the pivot bolt 43.

The top plate 41 has a longitudinal slot therein which extends from adjacent the bolt 43 through the outer end of the plate, this slot being indicated by the reference character 49. The opposing faces of the slot have formed therein the grooves 50 and slidably positioned in the slot is a slide member 51 having side edge flanges 52 which engage in the grooves 50.

The slide 51 carries the inch scale 52, the base or reference line 53 of which scale is in alignment with the pivot center of the bolt 43. This slide is formed of a clear plastic or other suitable clear transparent material so that the markings upon the base plate 10 therebeneath can be easily seen therethrough and the divisions of the scale 52 can be readily matched with points or lines on the base plate.

In addition to the linear scale 52 the slide carries one-half of a vernier scale 54, the other half being laid out on the top plate 41 at the edge adjacent to the slide.

Vernier adjustment of the slide 51 is effected by means of the vernier knob 55 which is carried upon a stud 56 which extends through the block 46 into an opening 57 in the slide, which opening joins an eccentric slot corresponding to the slots 35a and 36a and the stud 56 carries a finger 58 extending into the eccentric slot of the opening so that upon rotation of the vernier knob and the stud attached thereto longitudinal movement may be imparted to the slide 51.

As one example of the use of the framing scale as laid out in FIG. 1, the reference line $d$ is used for common rafters and assuming that the span of the roof is 24′ with ⅓ pitch, or a total of 8′ in vertical rise, the grid point on the reference line $d$ which is marked with the numeral 8, and as is indicated by the reference character 26 in FIG. 1 is correlated with the base of the scale 17 formed by the edge 16 of the indicator, which is radially extending from the center of the pivot bolt 12a of assembly 12 of the indicator. The position of the indicator in FIG. 1 illustrates the proper alignment of the scale on the indicator with this particular reference point on the reference line $d$ corresponding to common rafters. At this point, the length of the rafter is indicated by the particular point on the scale of the indicator, in this case, 14′5″ and a little over, the scale being marked off in main graduations of feet and sub-graduations of inches. At this point, the vernier is operated in a manner presently set forth by moving the indicator 11 outwardly until the next one inch graduation mark reaches the center of the vertical line $d$, the vernier at this point giving a reading of 5/32 of an inch. The length of the rafter will then be 14′5 5/32″, the tail or overhang of the rafter being added to this length, the vernier graduations being, as previously stated, of the magnitude of 1/32 of an inch.

In the specific example given above, the indicator, as set forth, will give the exact length of the rafter and to make the proper scribings or marks on the piece of lumber from which the rafter is to be cut, the side edge of the indicator is engaged against a longitudinal edge of the lumber piece and the side B of the framing scale is used to scribe the plumb cut and the side A is used to scribe the seat cut, see particularly FIGS. 11 and 12 which illustrate the scribed and cut lumber respectively.

As another example, in determining the length, plumb, seat and side cuts for a hip rafter for a building having a 24′ span and a pitch of ⅓, the reading on the scale is taken with the indicator scale base line 25 aligned with the reference point 28a on the reference line $a$ corresponding to hip and valley rafters, the reference point 28a being the indication of the vertical rise, or 8′. In this case, the scale on the indicator would indicate 18′ 9″ and a little over and after the vernier reading is taken, the total length would be indicated as 18′9 15/32″. With the indicator locked in position with the base line of its scale aligned with the reference point 28a, the plumb cut for the hip rafter would be scribed along the side B, and the seat cut along the side A. The side cut is then determined by swinging the indicator so as to align along the base of its scale with the reference line 60 among the group 61 which are for the side cuts of 45° hips, there being other groups 62 and 63 for side cuts of jacks and side cuts of octagonal jacks respectively. These various cuts are illustrated in FIG. 13.

In FIG. 11, the line 64 is that which is scribed by utilizing the side B of the base plate, as are the lines 65 and 66 and the line 67 is scribed by utilizing the side A of the base plate with the indicator positioned as mentioned in the first example. The finished rafter has the appearance as shown in FIG. 12, the notch 68 being formed by cutting out along the lines 64 and 67 and the two end edges 69 and 70 being formed by cutting along the lines 65 and 66. The distance between the points 71 and 72 in FIG. 11 is determined by reading on the scale of the indicator and represents the length of the rafter, the portion 73 in excess of this length being the overhang of this particular rafter.

Likewise, in FIG. 13, the lines 74 and 75 are scribed along the vertical side edge B of the base plate with the indicator being set up as per the second example enumerated above, the line 76 is scribed along the lower edge A of the base plate. The line 77 for side cut is scribed by utilizing the side edge B with the indicator positioned in a corresponding point in the groups 60, 61 or 62. Likewise, the distance between the points 78 and 79 is measured in accordance with that indicated by the scale on the indicator.

From the foregoing examples, it is believed to be clear how hip and jack rafters are to be marked off and cut to be joined in the conventional manner as illustrated in FIG. 15, where the hip and jack are designated respectively 80 and 81.

The illustrations of different rafter cuts, as here given in FIGS. 11 to 15, may be placed on the back of the base plate together with other information which might be of assistance to the user, as for example, in cutting the hip for the required amount of drop, the half thickness of the rafter might be marked off from the top edge of the rafter on a line 82 paralleling the seat cut and anywhere on the side of the rafter and the amount to be removed would then be indicated by scribing the line 83 along the side of the rafter parallel with the top edge.

I claim:

1. A carpenter's framing scale comprising a rectangular base plate having one face on which is laid out a series of spaced horizontal division lines and spaced vertical division lines perpendicular to the horizontal lines, certain of said vertical division lines representing different types of rafters and the horizontal division lines representing the vertical rise of a roof structure, an elongate indicator comprising two long flat parallel and superposed bars having the base plate therebetween and having a length greater than the major diagonal length of the base plate, separators between and securing the bars together at the ends thereof, a linear scale carried by and extending longitudinally of the indicator, means coupling the indicator adjacent to one end thereof to the base plate adjacent to one corner of the latter, said means forming a fixed pivot at the intersection of a bottom horizontal and a side vertical division line about which the indicator may swing over said face of the base plate, said linear scale being calibrated in divisions corresponding to the length of rafter sections to be cut, said linear scale having a base line radial to said pivot axis, means whereby the division lines on the base plate may be viewed through the top one of said bars along substantially the entire length of said top bar and along said base line, means for securing the indicator to the base plate against swinging movement, a vernier embodying a first scale carrying part stationary on and movable with respect to the indicator and a second scale part movable with the linear scale, a finger operated rotary means operatively supported on said first scale carrying part for turning on an axis perpendicular to the base plate, said rotary means carrying a radial finger having operative engagement with one of said bars of the indicator and functioning upon the turning of the said rotary means to effect relative movement between the scale parts of the vernier and the longitudinal movement of the linear scale.

2. A carpenter's framing scale comprising a rectangular base plate having one face on which is laid out a series of spaced horizontal division lines and spaced vertical division lines perpendicular to the horizontal lines, certain of said vertical division lines representing different types of rafters and the horizontal division lines representing the vertical rise of a roof structure, an elongate indicator having straight parallel longitudinal edges, a linear scale carried by and extending longitudinally of the indicator, means forming a pivot fixed to the base plate adjacent to one corner of the latter with its axial center at the point of intersection of the bottom horizontal line and a side vertical division line, said pivot forming means passing through and pivotally coupling the indicator at one end of the latter to the base plate whereby the indicator may swing over the face of the base plate about the axis of the pivot means, said scale being calibrated in divisions corresponding to the length of rafter sections to be cut, the sides of the base plate being parallel to the horizontal and vertical division lines and forming scribing straight edges, the longitudinal edges of the indicator providing straight edges for positioning an edge of the base plate for use as a scribing guide across a piece of lumber, the said indicator comprising two long flat parallel and superposed bars having the base plate therebetween and having a length greater than the diagonal length of the base plate, separators between and coupling the ends of the bars together, the top one of the bars having a longitudinal slot through which the divisions of the base plate are viewed, said linear scale having a base line extending radially of the pivot coupling, means for drawing the top bar into clamping engagement with the interposed base plate, a cover plate on the said top bar at the pivoted end of the indicator, the top bar having a rectangular opening therein beneath the cover plate, a rectangular block fixed to the cover plate and engaged in said opening, the opening having a length greater than the block in the longitudinal direction of the indicator, the pivot coupling including a bolt extending freely through an opening in the rectangular block and said means for drawing the top bar into the clamping engagement with the base being a thumb nut threaded on the bolt, the cover plate and the said top bar carrying cooperating vernier scales, and means on the cover plate engageable with the indicator for imparting longitudinal movement to the indicator relative to the cover plate.

3. A carpenter's framing scale comprising a rectangular base plate having one face on which is laid out a series of spaced horizontal division lines and spaced vertical division lines perpendicular to the horizontal lines, certain of said vertical division lines representing different types of rafters and the horizontal division lines representing the vertical rise of roof structure, an elongate indicator having straight, parallel longitudinal edges, a linear scale carried by and extending longitudinally of the indicator, means forming a pivot fixed to the base plate adjacent to one corner of the latter with its axial center at the point of intersection of the bottom horizontal line and a side vertical division line, said pivot forming means passing through and pivotally coupling the indicator at one end of the latter to the base plate whereby the indicator may swing over the face of the base plate about the axis of the pivot means, said scale being calibrated in divisions corresponding to the length of rafter sections to be cut, the sides of the base plate being parallel to the horizontal and vertical division lines and forming scribing straight edges, the longitudinal edges of the indicator providing straight edges for positioning an edge of the base plate for use as a scribing guide across a piece of lumber, means carried by the indicator for effecting longitudinal adjustment of the linear scale, with respect to the divisions on the base plate, and a vernier embodying one scale part carried by the indicator and a second scale part cooperating with the one part and fixed relative to the indicator.

4. A carpenter's framing scale comprising a rectangular base plate having one face on which is laid out a series of spaced horizontal division lines and spaced vertical division lines perpendicular to the horizontal lines, certain of said vertical division lines representing different types of rafters and the horizontal division lines representing the vertical rise of a roof structure, an elongate indicator having straight, parallel longitudinal edges, a linear scale carried by and extending longitudinally of the indicator, means forming a pivot fixed to the base plate adjacent to one corner of the latter with its axial center at the point of intersection of the bottom horizontal line and a side vertical division line, said pivot forming means passing through and pivotally coupling the indicator at one end of the latter to the base plate whereby the indicator may swing over the face of the base plate about the axis of the pivot means, said scale being calibrated in divisions corresponding to the length of rafter sections to be cut, the sides of the base plate being parallel to the horizontal and vertical division lines and forming scribing straight edges, the longitudinal edges of the indicator providing straight edges for positioning an edge of the base plate for use as a scribing guide across a piece of lumber, said indicator including a long flat bar lying upon the said one face of the base plate and having a length at least as great as the diagonal length of the base plate, said bar having a longitudinal slot formed therethrough and substantially the entire length thereof through which the divisions on the face of the base plate are viewed, said linear scale having a base line extending radially of the pivot coupling, means for securing said indicator bar to and against pivotal movement over the face of the base plate, said indicator bar having a rectangular opening therein adjacent to the said one end of the indicator bar, a cover plate on said indicator bar adjacent to the pivoted end of the latter and overlying and covering said rectangular opening, a rectangular block fixed to the cover plate and positioned in said opening, the opening having a length greater than the block in the longitudinal direction of the indicator, whereby the indicator bar is longitudinally slidable relative to the block, the said pivot coupling including a bolt extending freely through an opening in the rectangular block and the said means for securing the indicator bar to and against the said face of the base plate being a thumb nut threaded on the bolt, the cover plate and the said indicator bar carrying cooperating vernier scales, and means on the cover plate engageable with the indicator bar for imparting longitudinal movement to the indicator bar relative to the cover plate.

5. A carpenter's framing scale comprising a rectangular base plate having one face on which is laid out a series of spaced horizontal division lines and spaced vertical division lines perpendicular to the horizontal lines, certain of said vertical division lines representing different types of rafters and the horizontal division lines representing the vertical rise of a roof structure, an elongate indicator having straight, parallel longitudinal edges, a linear scale means carried by and extending longitudinally of the indicator, means forming a pivot fixed to the base plate adjacent to one corner of the latter with its axial center at the point of intersection of the bottom horizontal line and a side vertical division line, said pivot forming means passing through and pivotally coupling the indicator at one end of the latter to the base plate whereby the indicator may swing over the face of the base plate about the axis of the pivot means, said scale being calibrated in divisions corresponding to the length of rafter sections to be cut, the sides of the base plate being parallel to the horizontal and vertical division lines and forming scribing straight edges, the longitudinal edges of the indicator providing straight edges for positioning an edge of the base plate for use as a scribing guide across a piece of lumber, means including a rotatable element supported on the indicator for effecting longitudinal shifting of the linear scale relative to the lined face of the base plate, said rotatable element being stationary relative to the supporting indicator as regards any movement of the element other than rotational, and the last said means further embodying structure having an operative coupling with the said scale means for imparting thrust to and effecting longitudinal movement of the scale means relative to the said face of the base plate.

6. A carpenter's framing scale comprising a rectangular base plate having one face on which is laid out a series of spaced horizontal division lines and spaced vertical division lines perpendicular to the horizontal lines, certain of said vertical division lines representing different types of rafters and the horizontal division lines representing the vertical rise of roof structure, an elongate indicator having straight, parallel longitudinal edges, a linear scale carried by and extending longitudinally of the indicator, means forming a pivot fixed to the base plate adjacent to one corner of the latter with its axial center at the point of intersection of the bottom horizontal line and a side vertical division line, said pivot forming means passing through and pivotally coupling the indicator at one end of the latter to the base plate whereby the indicator may swing over the face of the base plate about the axis of the pivot means, said scale being calibrated in divisions corresponding to the length of the rafter sections to be cut, the sides of the base plate being parallel to the horizontal and vertical division lines and forming scribing straight edges, the longitudinal edges of the indicator providing straight edges for positioning an edge of the base plate for use as a scribing guide across a piece of lumber, means carried by the indicator for effecting longitudinal adjustment of the linear scale with respect to the divisions on the base plate, said indicator comprising two long flat parallel and superposed bars having the base plate therebetween and having a length greater than the diagonal length of the base plate, separators between and coupling the ends of the bars together, the top one of the bars having a longitudinal slot extending substantially the entire length thereof through which the divisions of the base plate are viewed, said linear scale having a base line extending radially of the pivot coupling, and means for drawing the top bar into clamping engagement with the interposed base plate.

7. The invention according to claim 6, with a transparent slide in said longitudial slot, a vernier scale on the slide in cooperative relation with a scale on the adjacent edge of the slot, and means coupling the slide and the slotted bar for longitudinally moving the slide, said last means including a pin journalled on the bar and passing through an enlarged opening in said slide, said pin having an eccentric element thereon positioned in said enlarged opening whereby rotation of the pin effects longitudinal sliding movement of the slide.

8. The invention according to claim 6, with a transparent slide in said longitudinal slot, a vernier scale on the slide in cooperative relation with a scale on the adjacent edge of the slot, and means coupling the slide and the slotted bar for longitudinally moving the slide.

References Cited in the file of this patent

UNITED STATES PATENTS

| | | |
|---|---|---|
| 29,767 | Chisholm | Aug. 28, 1860 |
| 745,271 | Bones | Nov. 24, 1903 |
| 944,799 | Lytle | Dec. 28, 1909 |
| 1,056,206 | Norman | Mar. 18, 1913 |
| 1,074,969 | Moore | Oct. 7, 1913 |
| 1,341,457 | Costovici | May 25, 1920 |
| 1,469,192 | Shepard | Sept. 25, 1923 |
| 2,107,670 | Karlson | Feb. 8, 1938 |
| 2,461,795 | Williamson | Feb. 15, 1949 |